United States Patent [19]
Grube et al.

[11] Patent Number: 5,987,331
[45] Date of Patent: Nov. 16, 1999

[54] COMMUNICATION SYSTEM TO COMMUNICATION SYSTEM GATEWAY METHOD AND APPARATUS

[75] Inventors: Gary W. Grube, Barrington; Mark L. Shaughnessy, Algonquin; Steven E. Norwood; William A. Felderman, both of Cary, all of Ill.

[73] Assignee: Motorola, Inc., Schaumburg, Ill.

[21] Appl. No.: 08/753,121

[22] Filed: Nov. 20, 1996

[51] Int. Cl.⁶ .................................. H04B 7/00; H04Q 7/20
[52] U.S. Cl. ........................... 455/509; 455/519; 455/520
[58] Field of Search ..................... 455/17, 11.1, 517–521, 455/524, 560, 422, 445, 527, 509, 450

[56] References Cited

U.S. PATENT DOCUMENTS

| | | | |
|---|---|---|---|
| 4,972,460 | 11/1990 | Sasuta | 455/519 |
| 5,054,110 | 10/1991 | Comroe et al. | 455/445 |
| 5,058,199 | 10/1991 | Grube | 455/520 |
| 5,101,502 | 3/1992 | Felderman et al. | 455/527 |
| 5,179,720 | 1/1993 | Grube et al. | 455/17 |
| 5,293,638 | 3/1994 | Sasuta et al. | 455/520 |

*Primary Examiner*—Nguyen Vo
*Attorney, Agent, or Firm*—Steven G. Parmelee; Susan L. Lukasik

[57] ABSTRACT

A method and apparatus of linking communication systems of different types. Call requests are directed from a sourcing communication unit in a first communication system (101) to a gateway (114), which translates identity and call type information from the first system to at least one other system (113). Next, the gateway requests radio frequency (RF) resources from each system to support the call. After sufficient RF resources have been received, and prior to the sourcing communication unit starting a call, the gateway (114) issues call start information to each of the communication systems (101, 113). Then, the gateway (114) is operable to receive and translate a message payload from the sourcing communication unit and distribute the translated message payload to communication units in the at least one other system.

20 Claims, 4 Drawing Sheets

COMMUNICATION SYSTEM TO COMMUNICATION SYSTEM GATEWAY METHOD AND APPARATUS

FIELD OF THE INVENTION

The present invention relates generally to communication systems and, in particular, to a method and apparatus to link dissimilar communication system types together to provide cross-system communication.

BACKGROUND OF THE INVENTION

Radio communication systems are known to include a multitude of communication units vying for a limited number of communication resources. The communication unit, which may be a mobile radio, a portable radio, or a dispatch console station, transmits service requests when the need arises to use a communication resource. Such services include, but are not limited to, private calls, talk group calls, interconnect calls, and dispatch calls. As is known, when a communication resource of the type being requested is available, a controller (such as a central controller) assigns an available communication resource to the requesting communication unit. At that time, the communication unit engages in the desired communication.

The users of such communication units are typically organized in talkgroups. Talkgroups often represent users that share a common mission, much like a workgroup. Such talkgroups can be rendered less effective, however, if substantially all services are not available at all times to all talkgroup members.

Numerous wireless system types exist to provide such communications. These systems often provide communication over a wide geographic region through the use of multiple base station radio sites, commonly known as cell sites. Generally, these wireless systems are limited to some maximum number of cell sites as a function of many factors, including switching center hardware limitations of the switching and call control equipment.

There is a growing trend among the users of these wireless communication systems to communicate with each other over larger geographic areas, thus urging the radio systems to extend their geographic coverage. Many of these wireless communication systems can be coupled to each other when they are of the same system type to provide the users with a composite larger system and hence an extended geographic operational area. It can be costly, however, to expand a wireless communication system in this manner, especially if the requirement for coverage in some geographic regions is minimal.

Furthermore, many times there is an existing installed base of varying types of wireless communication systems that can provide acceptable communication service within parts of the desired composite coverage area. Multi-mode communication units exist that support communication in a variety of modes (one at a time), such as either analog or digital wireless communication. The desire of talkgroup communication unit users to consistently share the same communication services, however, is often not met when they operate from varying wireless communication system types. For example, talkgroup members split between two or more wireless communication system types may not be able to communicate with each other, and when they can, often only the most basic communication services are supported as the system external interfaces often support only the simplest communication services.

One way to join two or more wireless communication systems is to use a dispatch console system cross patch. While this may provide some basic cross system communication, it is usually associated with many limitations, including missed calls (since channel resource non-availability is generally not a factor considered in the patch logic), limited audio quality (due to the transformation of speech signals from a first digital format into analog and then into a second digital format), and missed speech (resulting from the slow speed of establishing a patched communication path).

Accordingly, a need exists to provide enhanced connectivity as between a first wireless communication system of a first type and at least a second wireless communication system of a second type that avoids the shortcomings of the prior art. In particular, a method and apparatus that permits a communication unit to operate from a different system type with other members in a same talkgroup without undue missed speech, missed calls, limited audio quality, and other compromises would represent a significant improvement.

DETAILED DESCRIPTION OF A PREFERRED EMBODIMENT

Figure 1:
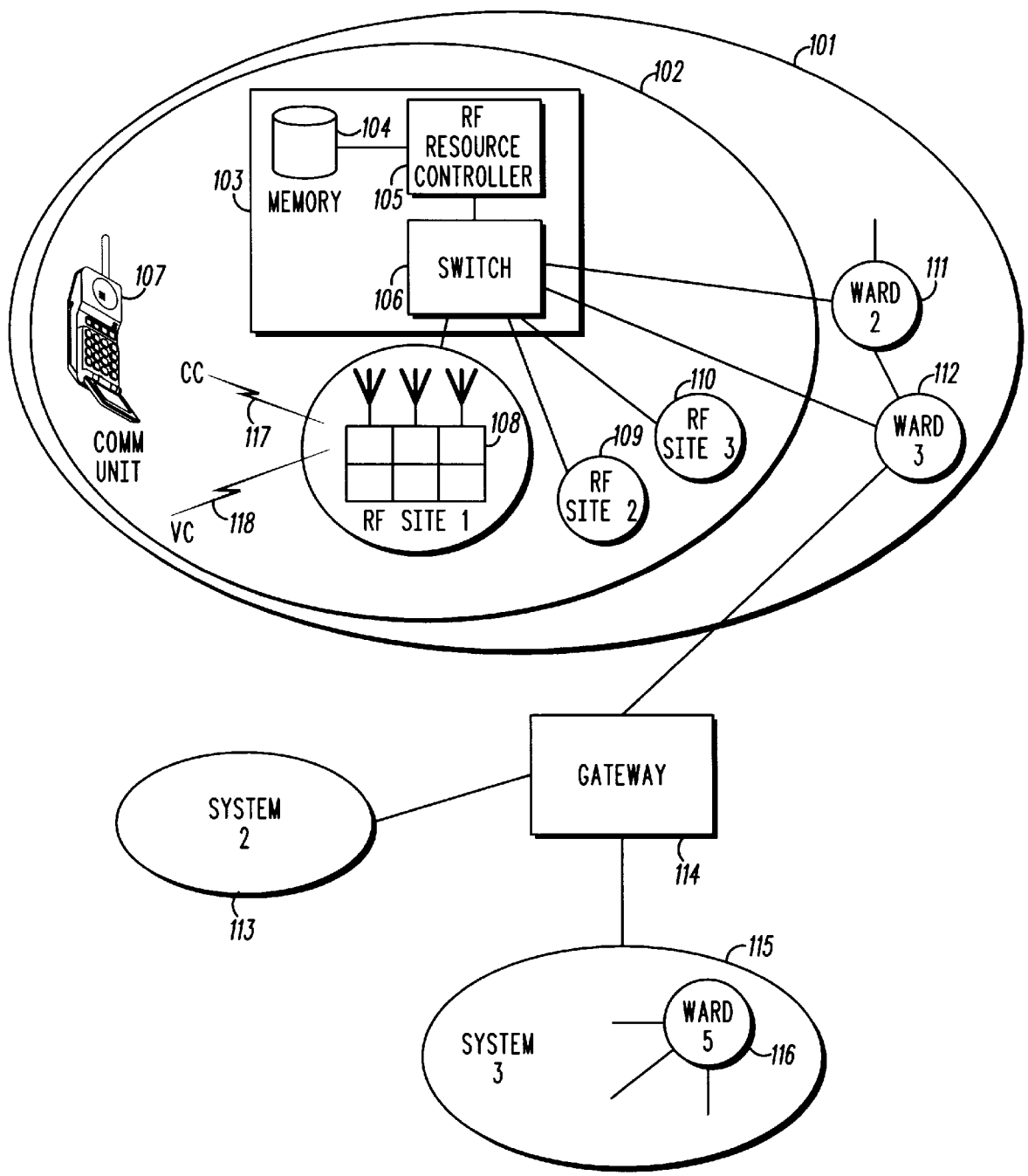
FIG. 1 shows varying layers of communication subsystems joined together, in accordance with the present invention.

The present invention encompasses a method of establishing communication between a first wireless communication system user and a second wireless communication system user where the first communication system is of a first type and the second communication system is of a second type. In particular, a method and apparatus is described that permits a communication unit to operate from a first system type 101 while communicating with other members of a common talkgroup where those other members are operating from at least one or more other communication systems 113 and 115 where the one or more other communication systems are of at least a second type.

Generally, communication requests are directed from the first communication system to a gateway 114. The gateway 114 receives the communication requests and translates the identity and call type information from the first system to at least a second system type. Next, the gateway 114 requests radio frequency (RF) resources from the first system 101 and from at least a second system 113 to support the communication. When sufficient RF resources have been allocated by all of the involved communication systems, the gateway 114 issues call start information to each of the involved communication systems 101 and 113.

Upon receiving the message payload from a sourcing communication unit operating on the first system, the gateway 114 translates that message payload into a message payload format compatible with the other communication systems 113 and 115. Upon translation of the message payload, the gateway 114 distributes the translated message payload to each of the other communication systems 113 and 115. Upon receiving the translated message payload from the gateway 114, the other communication systems 113 and 115 broadcast the translated message payload to the communication units operating within the other communication systems.

This method and apparatus enables communication units, belonging to a common talkgroup, to communicate over wider geographic regions between different system types while minimizing the amount of missed speech and missed calls, improving audio quality, and improving other compromises that are present with prior art communication systems and methods.

The present invention can be better understood with reference to FIGS. 1–5. FIG. 1 shows varying layers of communication sub-systems joined together, in accordance with the present invention. At the highest level, system 1 101, system 2 113, and system 3 115 are operably linked through a gateway 114. Each communication system may be of a different type, for example, analog cellular, digital cellular (e.g. IS-54), Global System for Mobile (GSM) cellular, or SmartZone OmniLink™ or iDEN™ as manufactured by Motorola, Inc. (Since the method and apparatus taught in the present invention for allowing communications between communication systems of different types is independent of the physical architecture within each of the systems that are being joined, only the elements of system 1 will be described. Each of the other systems may be substantially comprised of the same functional elements as system 1, with minor variations in switching and control architecture. Again, these variations are not pertinent to the present invention.) Each of the other systems may also use different RF modulation types, and operate in different RF frequency bands.

System 101 is typically further comprised of at least one ward 102. A ward is a natural sub-system grouping of RF sites 108, 109, and 110, a switch 106 needed to connect them, an RF resource controller 105, memory 104 used to provide communications control, and the communication units 107 (one of a plurality shown) operating within a particular geographic area. As known in the art, an actual switch element 106 may not be required, as some networking technologies, such as a routed LAN network, can perform the traffic switching function via distributed routing. A ward typically provides communications for a regional geographic area, such as a county or part of a state. A system is typically comprised of a plurality of wards, with all being of a common system type. In the system 101 depicted, three wards 102, 111, and 112 are operably linked together, forming a large multi-region statewide or countrywide (or larger) communications system.

Each ward typically includes a ward master site 103 that is further comprised of an RF resource controller 105 operably coupled to a database memory 104 and a switch 106. The RF resource controller 105 provides control over the assignment of communication resources within the ward, and coordinates with other RF resource controllers in other wards to assign resources for communications that span multiple wards. The RF resource controller is typically a computer (for example a Sparc Ultra1 as made by Sun Microsystems, Inc.) or a plurality of processing platforms in a distributed processing architecture that runs specialized call processing and resource management software to accomplish these tasks. The memory 104, often called a home location register (HLR) in the art, typically contains communication unit attributes and location information in order to support the call processing of the RF resource controller 105.

The switch 106, for example an Ambassador Electronics Bank (AEB) made by Motorola, Inc., operably connects subscriber payload and control information between the RF sites 108, 109, and 110 as well as between the other wards 111 and 112.

Each RF Site 108, 109, and 110 is comprised of RF repeater resources supporting both control channel 117 and voice (or other message payload-like data, such as video or short messages) channel 118 traffic over-the-air to and from the communication units 107 (one of a plurality being shown). The control channel 117 and voice channel 118 may use Frequency Division Multiple Access (FDMA), Time Division Multiple Access (TDMA), or Code Division Multiple Access (CDMA) techniques as appropriate to the application. These RF repeater resources 108, 109, and 110, may, for example, be comprised of IntelliRepeaters™ made by Motorola, Inc.

Figure 2:
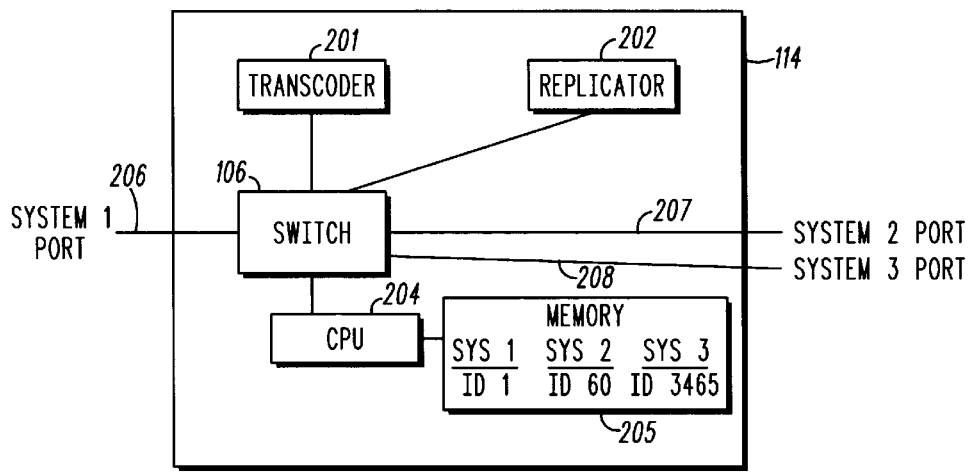
FIG. 2 shows a block diagram of gateway apparatus, in accordance with the present invention.

Referring to FIG. 2, a gateway ward controller 114 provides the necessary translation needed to provide communications between two or more communication systems of more than one type. This specialized ward controller is comprised of a transcoder 201 (e.g., a Digital Interface Unit, model F2040 available from Motorola, Inc.), a replicator 202 (e.g., a packet duplicator, available from Motorola, Inc., described in U.S. Pat. No. 5,416,770), the switch 106 (e.g., a packet switch, model IPX16 available from Stratacom, Inc. or a suitable WAN or LAN network), a central processing unit (CPU) 204 (e.g., an MC68040 microprocessor system available from Motorola, Inc.), and data storage memory 205 (e.g., dynamic random access memory (DRAM), magnetic hard drive, optical memory, or flash memory). The switch 106 provides interfaces 206–208 for interfacing control information and payload information between the ward controller 114 and system 1 by way of system port 1 206, system 2 by way of system port 2 207, and system 3 by way of system port 3 208.

The transcoder 201 will receive messages from the CPU 204 that will instruct the transcoder 201 to take a selected inbound payload (e.g., vector sum excited linear predictive coded voice (VSELP) voice frames) from the switch 106 and convert the VSELP payload to a different format payload (e.g., improved multi-band excitation (IMBE) voice frames). The switch 106 provides a means to transfer control information and payloads between the different systems. The switch 106 will receive the selected inbound payload from a sourcing communication unit within a given ward of a given system. The switch 106 will address the different format payload to a selected communication system when there is only one target system, or to the replicator 202 when the different format payload is to be distributed to multiple communication systems that use the same payload format.

The replicator 202 receives different format payload packets from the switch 106 and makes copies of each different format payload packet for each of the participating communication systems. Each different format payload packet is addressed to the proper communication system and sent to the switch 106 for distribution.

The CPU 204 provides control of the ward controller 114. Call requests, resource requests, and call start information are received from any one of the communication interfaces 206–208 and routed through the switch 106 to the CPU 204. The CPU 204 extracts the necessary information from the received messages, where the extracted control information may include the communication unit's individual and group identifications (IDs) and type of service requested. The CPU 204 uses this information to access the data storage memory 205 to determine which of the other systems may need to be part of this call and to determine which IDs will be used for communications to the other systems. (For example, if ID1 on System 1 were used, it may translate to ID60 on System 2 and ID 3465 on System 3.)

The CPU 204 will send the information, which may include resource requests and call start information, out to the other systems through the switch 106 and the system interface ports 206–208 to establish communications. The CPU 204 will also send messages to the switch 106 to set up the routing paths for the payload that will be received from the communication system sourcing a call. The routing paths could direct the payload to the replicator 202 for a three-or-more communication system call and the replicated payload would be routed to the other system interfaces 206–208. The routing paths could be set up to route the payload to the replicator 202 and then to the transcoder 201 and then to the other system interfaces 206–208 for calls that need a translation. Other combinations of routing the payload using the transcoder and replicator are of course also possible.

The memory 205 is also used by the CPU 204 during the normal course of its processing to store and retrieve temporary control information, program steps, system database information, and any dynamic parameters needed during program execution.

The system interface ports 206–208 provide a communication path from the ward controller 114 to the other communication systems. Each of the system interfaces 206–208 could use a different physical communication media (e.g., a V.35 interface, an Ethernet interface, or other physical communication connections know in the art). In addition, the protocol used on these communication paths could be any suitable protocol know in the art (e.g., TCP/IP, X.25, and others).

The method to transfer information within the ward controller 114 may be a parallel data bus, multi-drop parallel data bus, serial data bus, or a time division multiplexed parallel or serial bus or other communication mechanism as known in the art.

Figure 3:
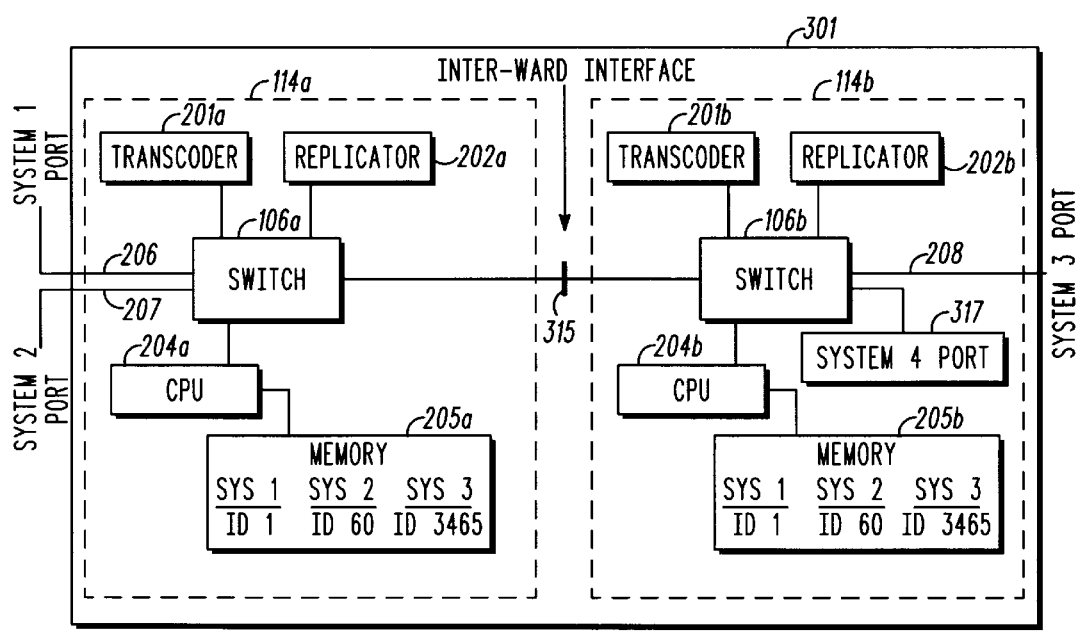
FIG. 3 shows an alternative block diagram of gateway apparatus, in accordance with the present invention.

An alternate embodiment appears in FIG. 3. In this embodiment, a multi-ward gateway 301 provides a bridge between two or more communication systems of more than one type. When there are multiple systems that are of the same type, the interfaces to these system would be made to a common ward controller 114A or 114B. If there is a system of a different type, a new ward controller could be used to interface to this system. A standard inter-ward interface 315 (such as those specified by the Association of Public Safety Communication Officers (APCO) Project 25 Inter-System Interface (ISI), or the Trans European Trunked Radio (TETRA) ISI or other ISIs known in the art) may be used to bridge the communication systems.

Ward controller A 114A and ward controller B 114B are each configured as described above. Also included are interfaces 206 and 207 for interfacing control information and payload information between ward controller A 114A and systems that are similar such as system 1 and system 2. A system interface 208 and 317 for system 3 and system 4, which is of a different system type than system 1 and system 2, is used for interfacing control information and payload information between ward controller B 114B and systems 3 and 4.

The transcoders 201A and B will receive messages from their CPU 204A or B that will instruct the transcoder 201 A or B to take a selected inbound payload (e.g., VSELP voice frames) from the switch 106A or B and convert the payload to a standard payload (e.g., IMBE voice frames) and address the standard payload to the counterpart ward controller 114A or B, a selected communication system, or to the replicator 202A or B so that the standard payload can be distributed to multiple communication systems that use the same standard payload format.

The replicator 202A or B takes the payload from the switch 106A or B and makes copies of each payload packet for each of the participating communication systems. Each payload packet is addressed to the proper communication system and sent to the switch 106A or B for distribution.

The switch 106A or B provides a means to transfer control signals and payload packets between the different systems and between ward controller A 202A and ward controller B 202B.

Call requests, resource requests, and call start information are received from any one of the communication interfaces 206, 207, 208, or 317 and routed through the switch 106A or B to the CPU 204A or B. The CPU 204A or B will extract the necessary information from the received messages where the extracted control information may contain such things as the communication unit's individual and group identifications (IDs), and type of service requested. The CPU 204A or B uses this information to access the data storage memory 205A or B to determine which of the other systems may be needed to be part of this call and to determine which IDs will be used for communications to the other systems. The CPU 204A or B will send the necessary information out to the other systems through the switch 106A or B, the system interface ports 206, 207, 208, or 317, and to the inter-ward interface 315 to set up the call. The CPU 204A or B will also send messages to the switch 106A or B to set up the routing paths for the payload that will be received from the call sourcing communication system.

The memory 205A or B is also used by the CPU 204A or B during the normal course of its processing to store and retrieve temporary control information, program steps, system database information, and any dynamic parameters needed during program execution.

Each of the system interfaces 206, 207, 208, and 317 could use a different physical communication media (e.g., V.35, Ethernet, or other physical communication connections as known in the art). In addition, the protocol used on these communication paths could be any suitable protocol as known in the art (e.g., TCP/IP, X.25, and others).

The method to transfer information within the ward controllers 114A and B may be a parallel data bus, multi-drop parallel data bus, serial data bus, or a time division multiplexed parallel or serial bus or other communication mechanism know in the art.

The inter-ward interface 315 provides a communication path between the ward controllers 114A and B. The physical interface could be any suitable interface (e.g., parallel data bus, multi-drop parallel data bus, a V.35 interface, an Ethernet interface, or other physical communication connection know in the art). In addition, the protocol used on these communication paths could be any appropriate protocol as known in the art (e.g., TCP/IP, X.25, and others).

Figure 4:
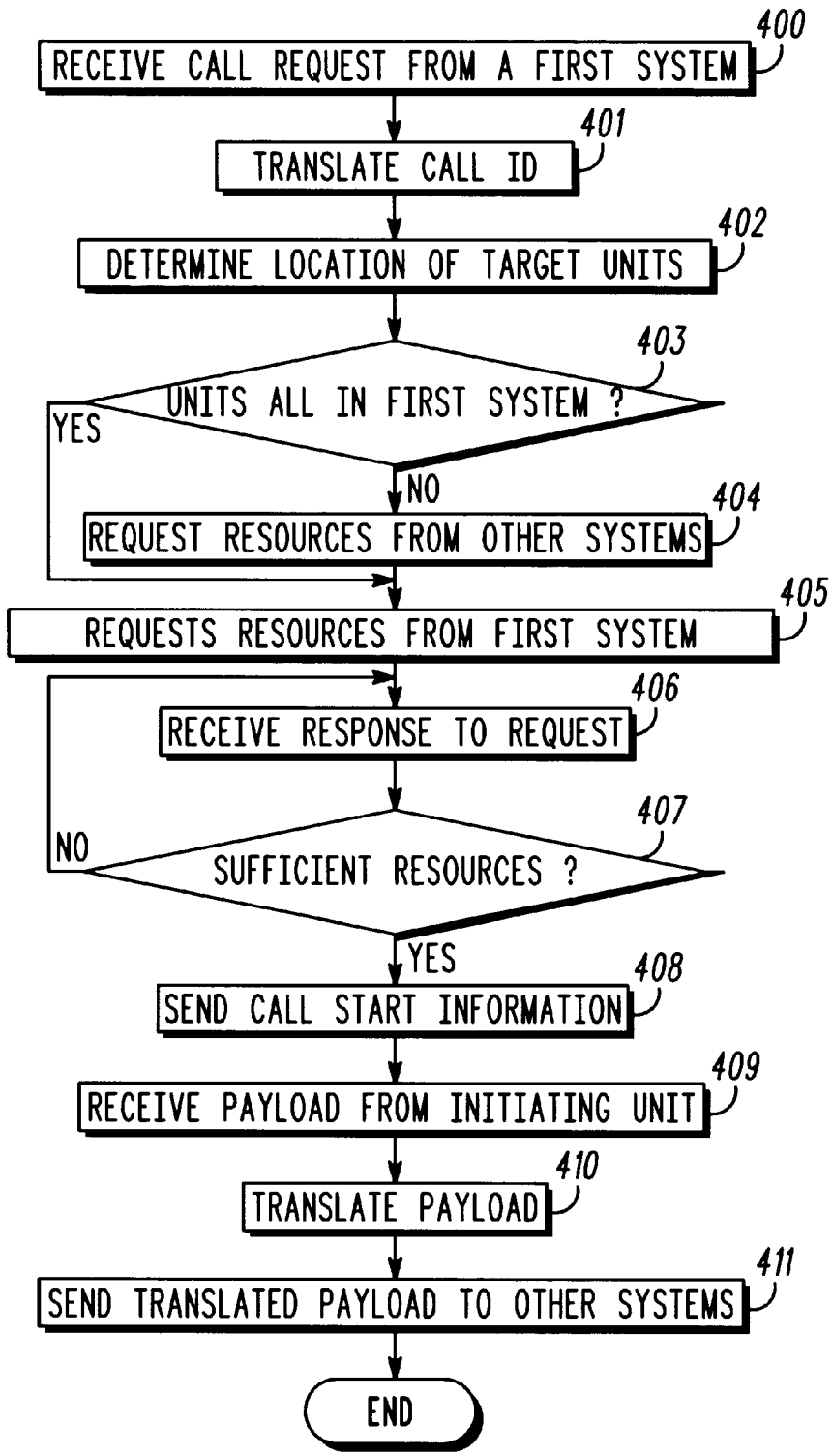
FIG. 4 shows a flow diagram depicting operation of the gateway apparatus, in accordance with the present invention.

FIG. 4 shows a more detailed depiction of a flow diagram of the operation of the gateway apparatus in accordance with the present invention. A communication request from a sourcing communication unit is received at the first communication system.

The first communication system produces a call request that includes a first identifier for at least one target communication unit. The call request is transmitted from the first communication system to the gateway. At step 400, the gateway receives the call request from the first radio frequency communication system. Different communication system types typically employ different user identification numbering schemes. The first identifier will be translated into at least a second identifier corresponding to the ID scheme that is used on at least a second communication system.

At step 401, the gateway uses the first identifier to determine a second identifier for the target communication unit. Note that, as known in the art, the identifier for the target may actually be an identifier for a target group of communication units, rather than just an individual. There are several methods to carry out this determination. One method is to use a look-up table, contained in the memory of the gateway, where a correspondence has been established between first identifiers and second identifiers. In this method, the correspondence is predetermined and may be the result of system operator entries or it may be a result of user registrations. A second method to determine the translation is to broadcast the first identifier over the air on the second system to a plurality of communication units. Included in the plurality of communication units is the target communication unit. Upon receiving the broadcast containing the first identifier, the target communication unit will respond with information regarding the second identifier. The second system, upon receiving that second identifier, transmits that second identifier information back to the gateway. (If the gateway were connected to not only a second communication system but a third and a fourth and a fifth communication system, where communication systems three through five also had communication units that were to be a target for this communication, then a similar process of translating the first identifier into identifiers for each of the third through fifth communication systems would be followed as described above.)

After the identities have been translated, the next step is to determine the location of the target units in step 402. There are several methods suitable for carrying out this step. One such method is by using a look-up table identifying an RF resource controller that is capable of supporting an RF communication unit to the target communication unit within the target communication system. This look-up table would be in a database or memory of an RF resource controller associated with the RF communication system. A second method would broadcast a page message on the targeted communication systems. Upon receiving that broadcast message, the target units would respond with a location message on their respective communication systems. (Alternatively, their location could be deduced by noting which RF site received the target unit's response message.) Based on that response, the RF communication systems would identify the appropriate RF resource controller. The appropriate RF resource controller would then choose RF communications resources to support the communication.

At step 403, it is determined if all of the target units are in the first system. The determination is made based on the location information that was determined in step 402. If all of the target communication units are in the first system then the process continues to step 405. If all of the units are not in the first system then the process continues to step 404. At step 404, the gateway carries out the same process of requesting RF communication resources from each of the other targeted communication systems. This may be in the form of either a call request or a resource request. A call request is used if the other communication system is to control the allocation of resources, whereas, a resource request is used if the gateway is to control the allocation of resources. Control of the allocation of resources is typically predetermined for each system and the gateway will adapt itself to each system's operational preference.

At step 405, the gateway will request RF communication resources from the RF resource controllers in the first system. Next, at step 406, the gateway receives a response to a request for RF communication resources from either the first system or from one of the other systems. A response to a request for RF communication resources may take two forms. A call start indication is received if the other communication system is to control the allocation of resources, whereas, a resource available indication is received if the gateway is to control the allocation of resources. Upon receiving a response, the gateway determines, at step 407, if sufficient resources are now available to support the intended communication. If sufficient resources are not available, then the process reverts back to step 406 where subsequent responses from RF resource controllers are received.

When sufficient resources are available, then the gateway will source call start information to all of the RF resource controllers at step 408 to facilitate the use of the RF resources to support the call request. The call start information will contain the identity of the target communication unit and other call information as appropriate to the application. With the resources established at each of the target communication systems and at the first communication system, the gateway will receive payload message information, at step 409, from the first communication system as it is transmitted to the first communication system by the sourcing communication unit. The payload is the information to be conveyed in the communication and may comprise data or voice formats.

At step 410, the gateway will translate the message payload from the first communication system to an appropriate type that is used on each of the target communication systems. Such translation methods are known in the art to convert digital signals into analog signals and analog signals back into a second digital signal format. Other methods in the art are known to translate a first digital signal format directly to a second digital format signal type.

At step 411, the translated message payload is now distributed by the gateway to each of the targeted communication systems. As each of the targeted communication systems receive the translated message payload, they will transmit the translated message payload to the target communication units.

Figure 5:
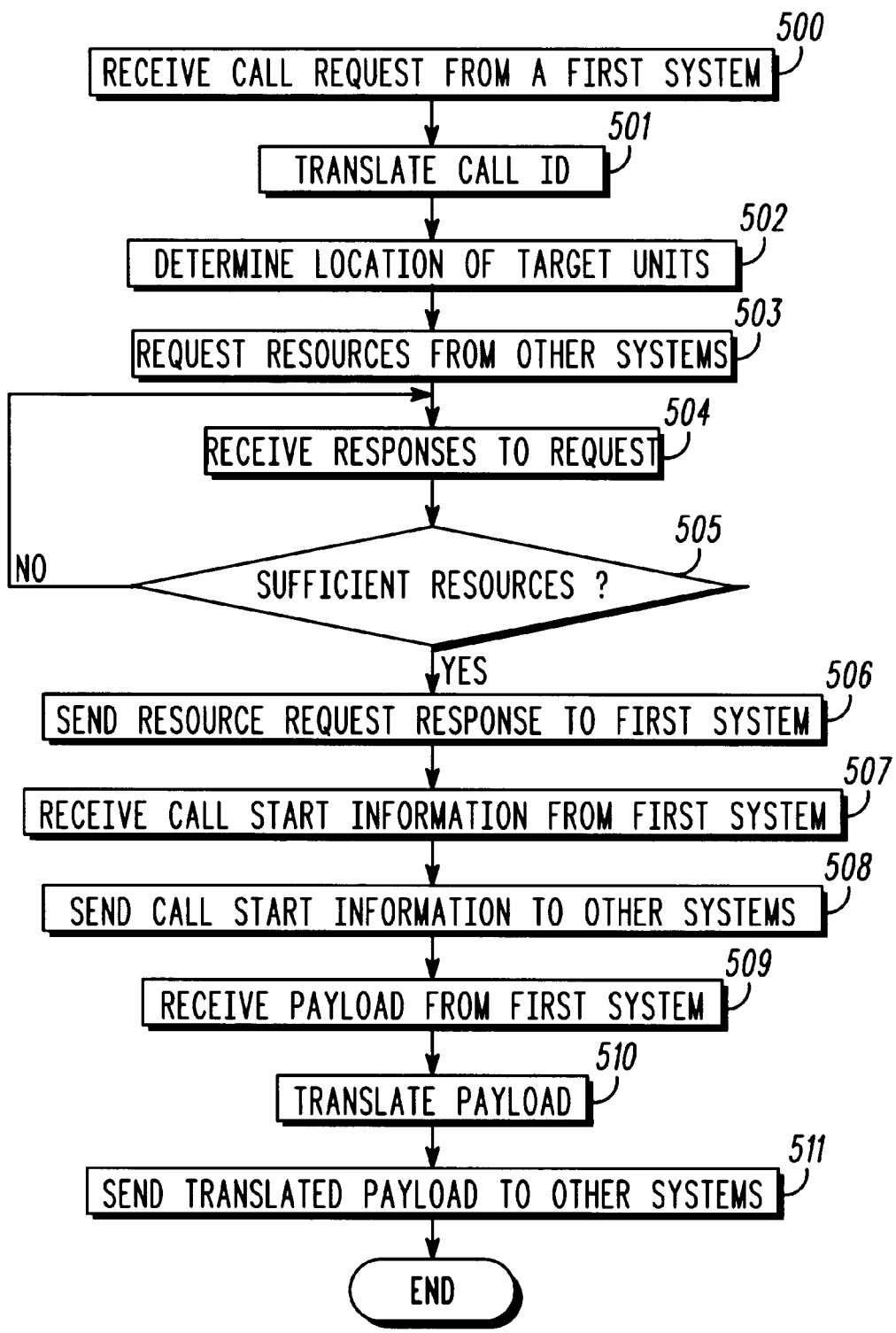
FIG. 5 shows an alternative flow diagram depicting operation of the gateway apparatus, in accordance with the present invention.

FIG. 5 shows a detailed depiction of an alternative flow diagram detailing the operation of the gateway apparatus, in accordance with the present invention. Generally, this alternative describes the operation of the gateway when the sourcing system supporting the initiating communication unit performs the task of requesting resources from the wards within the sourcing communication system, rather than the gateway as described in the flow diagram in FIG. 4.

A primary resource request from a sourcing communication unit is received at the first communication system at a first ward master site. The primary resource request will include a first identifier for at least one target communication unit. The first ward master site controller will determine which of the other wards within the first communication system are required to support the requested communications. The first ward master site controller will produce secondary resource requests for each of the required wards. The secondary resource request is transmitted from the first communication system to the gateway.

At step 500, the gateway receives the secondary resource request from the first radio frequency communication system. The first identifier will be translated into at least a second identifier corresponding to the ID scheme that is used on at least a second communication system. At step 501, the gateway uses the first identifier to determine a second identifier for the target communication unit. There are several methods to carry out this determination. One method again is to use a look-up table, contained in the memory of the gateway, where a correspondence has been established between first identifiers and second identifiers. A second method to determine the translation is to again broadcast the first identifier over the air on the second system to a plurality of communication units.

After the identities have been translated, the next step 502 is to determine the location of the target units in all systems other than the sourcing first RF system where the sourcing system has already determined the locations of the target communication units within the sourcing first RF system. There are several methods to carry out this determination of location of the target units. One such method is by using a look-up table identifying a RF resource controller that is capable of supporting an RF communication unit to the target communication unit within the target communication system. This look-up table would be in a database or memory of an RF resource controller associated with the RF communication system. A second method to determine the location of the target units is to broadcast a page message on the targeted communication systems. Upon receiving that broadcast message, the target units would respond with a location message on their respective communication systems. (Alternatively, their location could be deduced by noting which RF site received the target unit's response message.) Based on that response, the RF communication systems would identify the appropriate RF resource controller. The appropriate RF resource controller would then choose RF communications resources to support the communication.

At step 503, the gateway uses the second identifier to request RF communication resources from each of the other targeted communication systems. This may be in the form of either a call request or a resource request. A call request is used if the other communication system is to control the allocation of resources, whereas, a resource request is used if the gateway is to control the allocation of resources. Control of the allocation of resources is typically predetermined for each system, but could be arbitrated between the gateway and other communication system controllers for each call.

Next, at step 504, the gateway receives a response to a request for RF communication resources from one of the other systems. A response to a request for RF communication resources may take two forms. A call start indication is received if the other communication system is to control the allocation of resources, whereas, a resource available indication is received if the gateway is to control the allocation of resources. Upon receiving a response, the gateway determines, at step 505, if sufficient resources are now available to support the intended communication. If sufficient resources are not available, then the process repeats back to step 504 where subsequent responses from RF resource controllers are received.

When sufficient resources are available, then the gateway sends information regarding the secondary resource request to the sourcing first RF communication system in step 506. This information would indicate that the gateway has lined up sufficient resources so that the communication payload can be rebroadcast to the target communication units. Since the sourcing first RF communication system had previously requested resources from wards within system 1, those responses will gate the start of the call as well.

When the sourcing first RF communication system determines that sufficient resources are available, it will transmit call start information to all of the wards in system 1 and to the gateway. The gateway receives the call start information in step 507 from the sourcing first RF communication system. Next, the gateway will source call start information to all of the RF resource controllers, outside of the sourcing first RF communication system, at step 508 to facilitate the use of the RF resources to support the secondary resource request. The call start information will again contain the identity of the target communication unit along with other call information. With the resources established at each of the target communication systems and at the first communication system, the gateway will receive payload message information, at step 509, from the first RF communication system as it is transmitted to the first communication system by the sourcing communication unit.

At step 510, the gateway will translate the message payload from the first RF communication system to an appropriate type that is used on each of the target communication systems as described above.

At step 511, the translated message payload is now distributed by the gateway to each of the targeted communication systems. As each of the targeted communication systems receive the translated message payload, they will transmit the translated message payload to the target communication units.

This method and apparatus enables communication units, within a common talkgroup, to communicate over wider geographic regions between different system types while minimizing missed calls and missed speech while improving audio quality and further improving other compromises that are present with prior art communication systems and methods.

What is claimed is:

1. A method, comprising the steps of:

receiving a call request from a first radio frequency (RF) communication system to support a communication request from a sourcing communication unit, which call request includes a first identifier for at least one target communication unit;

automatically using the first identifier to determine a second identifier for the target commnuication unit, which second identifier is different from the first identifier;

automatically using the first identifier to request provision of RF resources in the first RF communication system to support the call request, and using the second identifier to request provision of RF resources in at least one RF communication system other than the first RF communication system to support the call request;

after receiving sufficient RF resources to support the call request, and prior to the sourcing communication unit starting a call, automatically sourcing call start information to each of the first RF communication system and the at least one RF communication system other than the first RF communication system to facilitate use of the RF resources to support the call request in the first RF communication system and in the at least one RF communication system other than the first RF communication system.

2. The method of claim 1, wherein the step of automatically using the first identifier to determine a second identifier for the target communication unit includes the step of:

using the first identifier to identify, in a lookup table, the second identifier.

3. The method of claim 1, wherein the step of automatically using the first identifier to determine a second identifier for the target communication unit includes the step of:

using the first identifier to identify, in a lookup table, a non-temporarily assigned other identifier, which other identifier comprises the second identifier.

4. The method of claim 1, wherein the step of automatically using the first identifier to determine a second identifier for the target communication unit includes the step of:

using the first identifier to identify, in a lookup table, a temporarily assigned other identifier, which other identifier comprises the second identifier.

5. The method of claim 1, wherein the step of automatically using the first identifier to determine a second identifier for the target communication unit includes the step of:

broadcasting the first identifier to a plurality of communication units, including the target communication unit.

6. The method of claim 5, wherein the step of automatically using the first identifier to determine a second identifier for the target communication unit further includes the step of:

in response to broadcasting the first identifier, receiving from the target communication unit a transmitted response, which transmitted response includes information regarding the second identifier.

7. The method of claim 1, wherein the step of using the second identifier to request provision of RF resources in RF communication systems other than the first RF communication system to support the call request includes the step of:

using the second identifier to identify an RF resource controller that is then capable of presently supporting an RF communication to the target communication unit.

8. The method of claim 7, wherein the step of using the second identifier to identify an RF resource controller includes the step of:

using the second identifier to identify the RF resource controller in a database that correlates RF resource controllers with present likely-locations of communication units.

9. The method of claim 7, wherein the step of using the second identifier to identify an RF resource controller includes the step of:

broadcasting a message using the second identifier;

receiving a response from the target communication unit, which response is received by a particular RF resource controller;

identifying the particular RF resource controller as the RF resource controller.

10. A method, comprising the steps of:

receiving a secondary resource request from a first radio frequency (RF) communication system to support a primary resource request from a sourcing communication unit, which primary request includes a first identifier for at least one target communication unit;

automatically using the first identifier to determine a second identifier for the target communication unit, which second identifier is different from the first identifier;

automatically using the second identifier to request provision of at least one RF resource in at least one other RF communication system to support the secondary resource request;

after receiving sufficient responses to the request for provision of at least one RF resource in at least one other RF communication system, and prior to the sourcing communication unit starting a call, automatically providing information regarding the secondary resource request to the first RF communication system;

when receiving call start information from the first RF communication system, automatically using the call start information, to cause the at least one other RF communication system to facilitate use of the at least one RF resource to support the secondary resource request.

11. The method of claim 10, wherein the step of automatically using the first identifier to determine a second identifier for the target communication unit includes the step of:

using the first identifier to identify, in a lookup table, the second identifier.

12. The method of claim 10, wherein the step of automatically using the first identifier to determine a second identifier for the target communication unit includes the step of:

using the first identifier to identify, in a lookup table, a non-temporarily assigned other identifier, which other identifier comprises the second identifier.

13. The method of claim 10, wherein the step of automatically using the first identifier to determine a second identifier for the target communication unit includes the step of:

using the first identifier to identify, in a lookup table, a temporarily assigned other identifier, which other identifier comprises the second identifier.

14. The method of claim 10, wherein the step of automatically using the first identifier to determine a second identifier for the target communication unit includes the step of:

broadcasting the first identifier to a plurality of communication units, including the target communication unit.

15. The method of claim 14, wherein the step of automatically using the first identifier to determine a second identifier for the target communication unit further includes the steps of:

in response to broadcasting the first identifier, receiving from the target communication unit a transmitted response, which transmitted response includes information regarding the second identifier;

automatically using the second identifier to request provision of at least one RF resource in at least one other RF communication system to support the secondary resource request.

16. The method of claim 10, wherein the step of using the second identifier to request provision of at least one RF resource in at least one other RF communication system to support the secondary resource request includes the step of:

using the second identifier to identify an RF resource controller that is then capable of presently supporting an RF communication to the target communication unit.

17. The method of claim 16, wherein the step of using the second identifier to identify an RF resource controller includes the step of:

using the second identifier to identify the RF resource controller in a database that correlates RF resource controllers with present likely-locations of communication units.

18. The method of claim 16, wherein the step of using the second identifier to request provision of at least one RF resource in at least one other RF communication system to support the secondary resource request includes the steps of:

using the first identifier to identify an RF resource controller that is then capable of presently supporting an RF communication to the target communication unit;

providing the second identifier to the RF resource controller that is then capable of presently supporting an RF communication to the target communication unit.

19. The method of claim 18, wherein the step of using the second identifier to identify an RF resource controller includes the step of:

using the first identifier to identify an RF resource controller in a database that correlates RF resource controllers with present likely-locations of communication units.

20. The method of claim 16, wherein the step of using the second identifier to identify an RF resource controller includes the steps of:

broadcasting a message using the second identifier;

receiving a response from the target communication unit, which response is received by a particular RF resource controller;

identifying the particular RF resource controller as the RF resource controller.

* * * * *